(12) United States Patent
Lan et al.

(10) Patent No.: US 11,150,810 B2
(45) Date of Patent: Oct. 19, 2021

(54) I/O DATA TRANSMISSION IN A HYPER-CONVERGED STORAGE SYSTEM

(71) Applicant: INTERNATIONAL BUSINESS MACHINES CORPORATION, Armonk, NY (US)

(72) Inventors: Long Wen Lan, Shanghai (CN); Jia Xiang Li, Wuhan (CN); Yang Li, Shanghai (CN); Zhuo Liu, Shanghai (CN); Wen Wu Na, Shanghai (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 174 days.

(21) Appl. No.: 15/880,890

(22) Filed: Jan. 26, 2018

(65) Prior Publication Data

US 2019/0235764 A1 Aug. 1, 2019

(51) Int. Cl.
*G06F 3/06* (2006.01)
*G06F 13/16* (2006.01)
*G06F 9/455* (2018.01)

(52) U.S. Cl.
CPC .......... *G06F 3/0613* (2013.01); *G06F 3/0631* (2013.01); *G06F 3/0665* (2013.01);
(Continued)

(58) Field of Classification Search
CPC .... G06F 3/0613; G06F 9/455; G06F 9/45558; G06F 2009/45583
See application file for complete search history.

(56) References Cited

U.S. PATENT DOCUMENTS 8,209,704 B1 * 6/2012 McCann ................. G06F 9/545
719/312
8,775,696 B2 7/2014 Scales et al.
(Continued)

FOREIGN PATENT DOCUMENTS

CN 105530306 A 4/2016
WO 2016122608 A1 8/2016

OTHER PUBLICATIONS

Cisco, "VMware Virtual SAN with Cisco Unified Computing System Reference Architecture", Aug. 6, 2014, Document ID: 1492667878445947, pp. 1-54.
(Continued)

*Primary Examiner* — Sanjiv Shah
*Assistant Examiner* — Alexander J Yoon
(74) *Attorney, Agent, or Firm* — Alexis N. Hatzis

(57) ABSTRACT

Embodiments of the present disclosure relate to a method for I/O data transmission in a Hyper-Converged Storage System (HCSS). The HCSS comprises at least one storage node having at least one device constructed with virtualization technology and a storage I/O processing module for accessing persistent storage resource of the HCSS. According to the method, an I/O request of a first type is received from the device by a System Disk front-end driver (SFD), wherein the I/O request of the first type is an I/O request to a system disk of the device. The I/O request of the first type and its corresponding response of a first type are transferred by the SFD between the device and the storage I/O processing module via a first shared memory, wherein the first shared memory is created by allocating a first memory region of the HCSS as the first shared memory.

20 Claims, 5 Drawing Sheets

(52) U.S. Cl.
CPC ........ *G06F 3/0689* (2013.01); *G06F 9/45558* (2013.01); *G06F 13/1663* (2013.01); *G06F 2009/45583* (2013.01)

(56) References Cited

U.S. PATENT DOCUMENTS

| | | | |
|---|---|---|---|
| 9,280,423 B1* | 3/2016 | Mam | G06F 11/1469 |
| 2007/0050765 A1* | 3/2007 | Geisinger | G06F 9/455 |
| | | | 718/1 |
| 2008/0005517 A1* | 1/2008 | Cholleti | G06F 12/0223 |
| | | | 711/165 |
| 2010/0251235 A1* | 9/2010 | Ganguly | G06F 9/45558 |
| | | | 718/1 |
| 2015/0254088 A1* | 9/2015 | Chou | G06F 9/45541 |
| | | | 709/212 |
| 2016/0004450 A1 | 1/2016 | Lakshman et al. | |
| 2016/0112540 A1* | 4/2016 | Xia | H04L 67/10 |
| | | | 709/203 |
| 2016/0299702 A1 | 10/2016 | Chawla et al. | |
| 2016/0359955 A1* | 12/2016 | Gill | H04L 67/1097 |
| 2018/0024964 A1* | 1/2018 | Mao | G06F 3/0655 |
| | | | 711/173 |

OTHER PUBLICATIONS

Karamanolis, "The Software-Defined Storage Platform of the Future", Aug. 28, 2015, (https://blogs.vmware.com/virtualblocks/author/christos_karamanolis/, pp. 1-8.

Microsoft, "Using a storage area network with virtual machines", printed Dec. 8, 2017, https://technet.microsoft.com/en-US/library/cc708298(v=ws.10).aspx, pp. 1-3.

Mell et al., "The NIST Definition of Cloud Computing", Recommendations of the National Institute of Standards and Technology, NIST Special Publication 800-145, Sep. 2011, 7 pages.

\* cited by examiner

I/O DATA TRANSMISSION IN A HYPER-CONVERGED STORAGE SYSTEM

BACKGROUND

The present disclosure relates to a Hyper-Converged Storage System (HCSS) and more specifically, to I/O data transmission in the HCSS.

A Hyper-converged Storage System (HCSS) is a software-defined approach to storage management that combines storage, computer networking and virtualization technologies in one physical unit that is managed as a single system. In a Hyper-Converged Storage System, storage is usually managed by a VM which runs in parallel with application VMs that use the storage. Storage is accessed either through iSCSI or other private network based protocols.

SUMMARY

According to one embodiment of the present invention, there is provided a method for input/output (I/O) data transmission in a Hyper-Converged Storage System (HCSS). The HCSS comprises at least one storage node having at least one device constructed with virtualization technology and a storage I/O processing module for accessing persistent storage resource of the HCSS. According to the method, an I/O request of a first type is received from the device by a System Disk Front-end Driver (SFD), wherein the I/O request of the first type is an I/O request to a system disk of the device. The I/O request of the first type and its corresponding response of a first type are transferred between the device and the storage I/O processing module via a first shared memory by the SFD, wherein the first shared memory is created by allocating a first memory region of the HCSS as the first shared memory.

According to one embodiment of the present invention, there is provided a system for I/O data transmission in a Hyper-converged Storage System (HCSS). The HCSS comprises at least one storage node having at least one device constructed with virtualization technology and a storage I/O processing module for accessing persistent storage resource of the HCSS, the system comprising a computer processor coupled to a computer-readable memory unit, the memory unit comprising instructions that when executed by the computer processor implements a method. According to the method, an I/O request of a first type is received from the device by a System Disk Front-end Driver (SFD), wherein the I/O request of the first type is an I/O request to a system disk of the device. The I/O request of the first type and its corresponding response of a first type are transferred between the device and the storage I/O processing module via a first shared memory by the SFD, wherein the first shared memory is created by allocating a first memory region of the HCSS as the first shared memory.

According to one embodiment of the present invention, there is provided computer program product for I/O data transmission in a Hyper-Converged Storage System (HCSS). The HCSS comprises at least one storage node having at least one device constructed with virtualization technology and a storage I/O processing module for accessing persistent storage resource of the HCSS. The computer program product comprising a computer readable storage medium having program instructions embodied therewith, the program instructions executable by a device to cause the electronic device to perform a method. According to the method, an I/O request of a first type is received from the device by a System Disk Front-end Driver (SFD), wherein the I/O request of the first type is an I/O request to a system disk of the device. The I/O request of the first type and its corresponding response of a first type are transferred between the device and the storage I/O processing module via a first shared memory by the SFD, wherein the first shared memory is created by allocating a first memory region of the HCSS as the first shared memory.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

Figure 1:
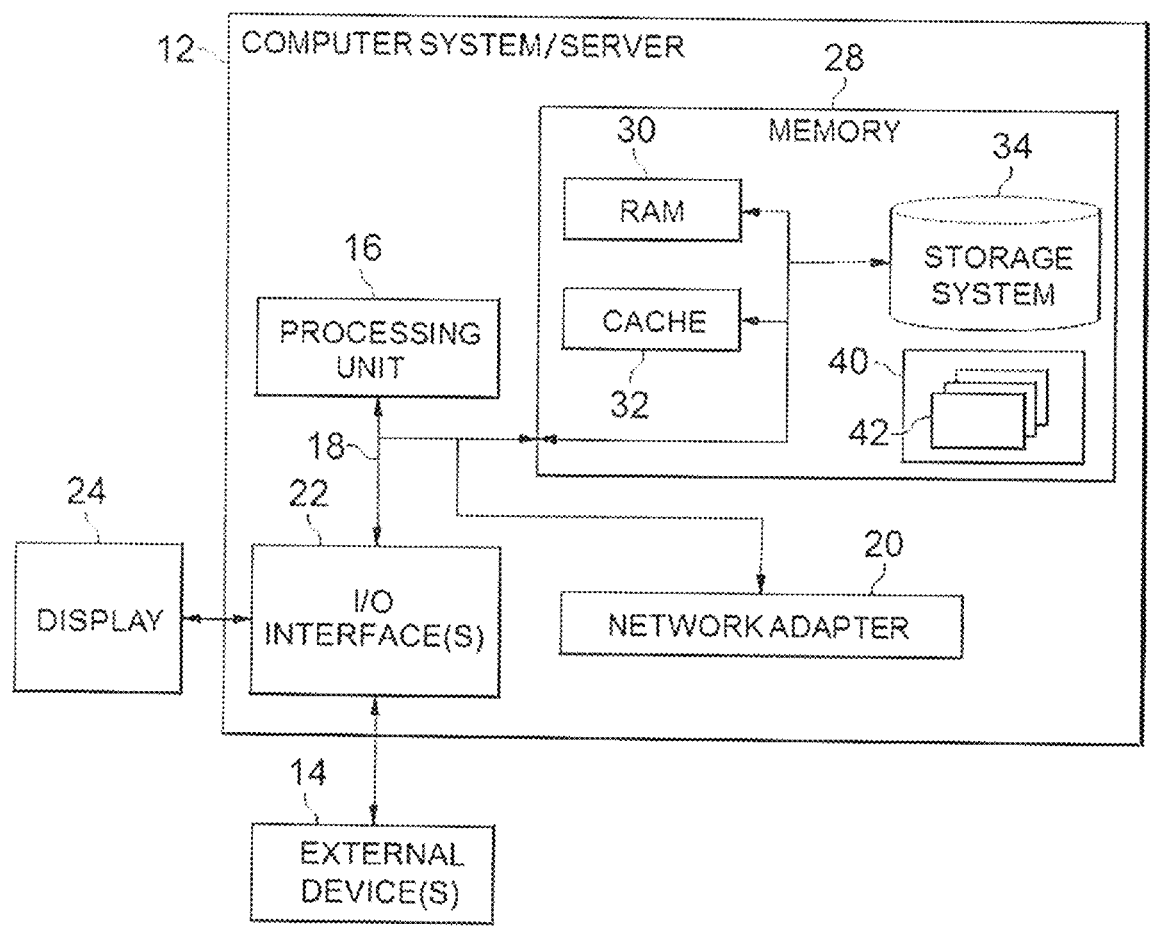
FIG. 1 illustrates an exemplary computer system which is applicable to implement the embodiments of the present invention.

Referring now to FIG. 1, in which an exemplary computer system/server 12 which is applicable to implement the embodiments of the present invention is shown. FIG. 1 is also adapted to depict an illustrative example of a portable electronic device such as a communication device which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules 42 that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 2:
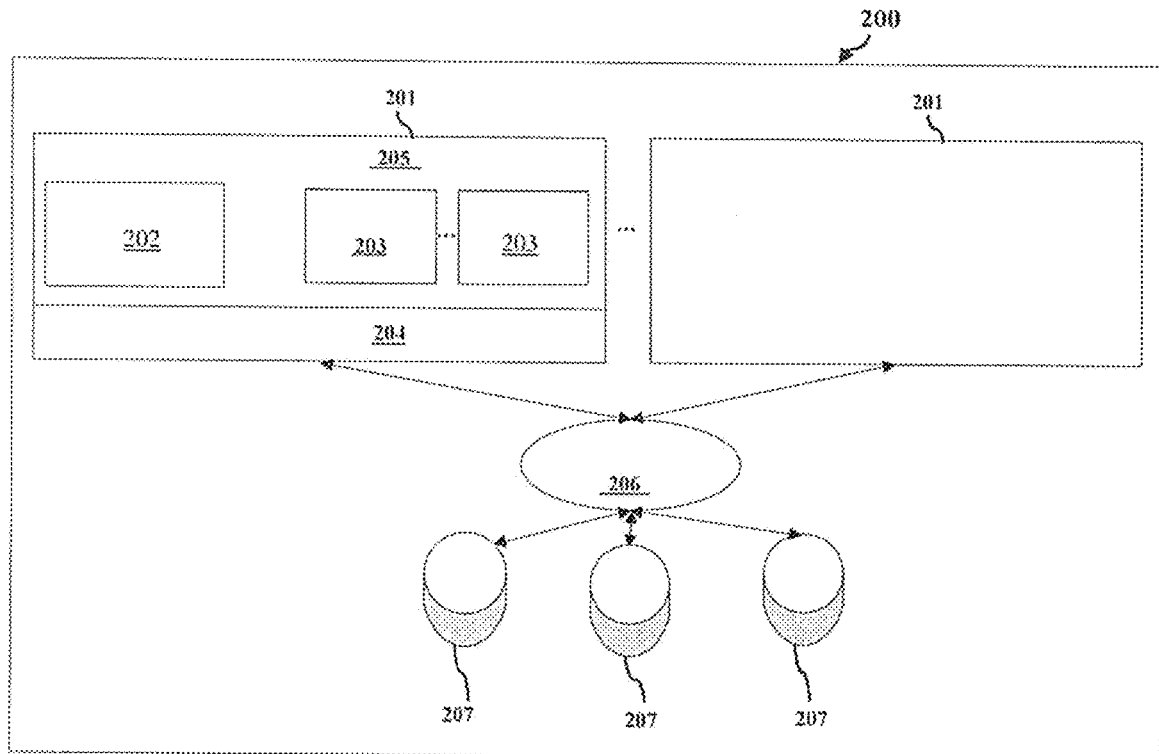
FIG. 2 illustrates the Hyper-converged Storage System 200 in which present disclosure can be implemented according to one embodiment of present disclosure.

FIG. 2 shows the Hyper-converged Storage System 200 in which present disclosure can be implemented according to one embodiment. HCSS 200 includes at least one Storage node 201, Switch 206 and at least one Disk array 207. The Storage nodes 201 are connected by the Switch 206. The Disk array 207 provided by other storage devices are connected by the Switch 206. Some Storage nodes 201 may have physical disks. Physical disks and the Disk array(s) 207 both belong to persistent storage resource, which may be virtualized as virtual disk(s) by Storage I/O module program instructions to. Each Storage node 201 is divided into kernel space 204 and user space 205, wherein user space 205 includes Storage I/O processing module 202 and at least one Device 203 constructed with virtualization technology. The Device(s) 203 works as computing node(s). The Storage I/O processing module 202 provides virtual disk(s) to the Device(s) 203 as a system disk or data disk (s). I/O requests to the system disk or data disk are generated in Device(s) 203. The Storage I/O processing module 202 may acquire the/IO requests from the Device(s) 203 and further access persistent storage resource. At last, the corresponding responses need to be transferred back to the Device(s) 203.

According to an existing solution, I/O requests to the system disk or data disk (s) and corresponding responses are transferred between the Storage I/O processing module 202 and the Device(s) 203 through iSCSI or other private network based protocols. As known, during network protocol based data transmission, each end point, as a sending end point or a receiving end point, need to analyze and packing/unpacking the data multiple times and pass the data package through all protocol layers, which takes much more processing time and introduce considerable overhead for time critical data processing. So network protocol based I/O data transmission makes the deployment of the HCSS more complex and gets poorer I/O performance because of protocol and network overhead. It would be advantageous to improve the I/O performance for the HCSS. The present disclosure provides a new mechanism to improve I/O performance in the HCSS.

Now the core idea of present disclosure is introduced. According to present disclosure, some memory regions in the kernel space 204 may be allocated as shared memories. I/O requests to the system disk or data disk (s) and corresponding responses may be transferred between the Device(s) 203 and the Storage I/O processing module 202 via the shared memories. Compared with the network protocol based I/O data transmission, present disclosure can take advantage of shared memory technology to directly transfer I/O data between the Device(s) 203 and the Storage I/O processing module 202, hence the HCSS can transfer more I/O data and take less time without any extra protocol overhead and cost. According to present disclosure, the Device(s) 203 may be implemented with, for example, but is not limit to, Virtual Machine (VM), containerization (also called container-based virtualization and application containerization). Virtual Machine (VM) in the following embodiments is merely for the purpose of illustration without suggesting any limitation as to the scope of the present disclosure. It can be understood for the person skilled in the art, any known or future emerging OS-level virtualization technology for deploying and running distributed applications may be applied to present disclosure.

Figure 3:
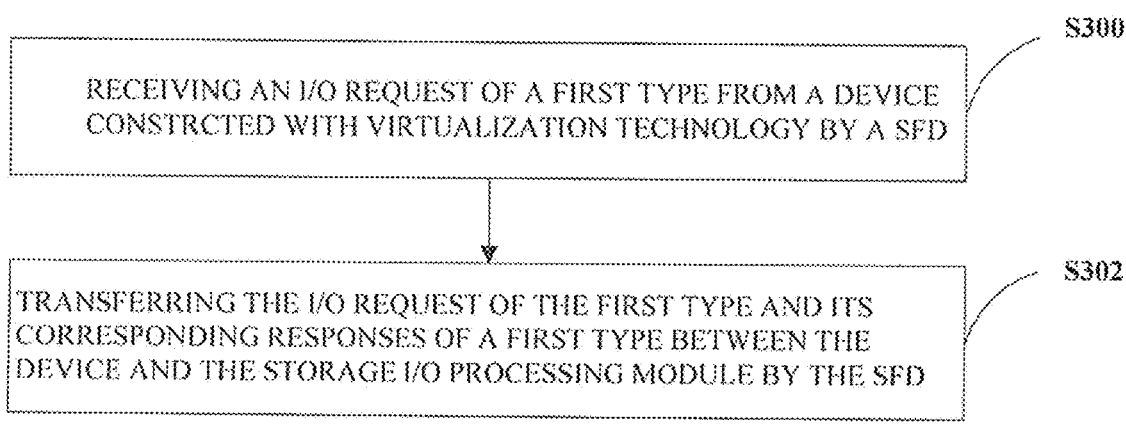
FIG. 3 is a flowchart illustrating an exemplary method for I/O data transmission in Hyper-converged storage system (HCSS) 200 according to one embodiment of present disclosure.

FIG. 3 shows an exemplary method for I/O transmission for system disk in hyper-converged Storage System (HCSS)

200 in accordance with present disclosure. With reference now to FIG. 3, starting at step S300, receiving an I/O request of a first type from a Device constructed with virtualization technology by a System Disk Front-end Driver (SFD), wherein the I/O request of the first type is an I/O request to the system disk of the Device. At step S302, transferring the I/O request of the first type and its corresponding response of a first type between the Device and the Storage I/O processing module via a first shared memory by the SFD, wherein the first shared memory is created by allocating a first memory region of the HCSS as the first shared memory. The following will describe the steps S300 and S302 in detail.

In responding to an initiation of the HCSS, a System Disk Back-end Driver (SBD) and the SFD are loaded along with the loading of core programs inside kernel of the HCSS, wherein the SBD is configured to allocate the first memory region of the HCSS as the first shared memory. According to one embodiment of present disclosure, the SBD can be implemented as a program in the Storage I/O processing module 202 which can communicate with the driver code in the kernel space 204 of the HCSS via the first shared memory. The SFD can be implemented as a program in the kernel space 204 of the HCSS which can communicate with the driver code in the user space 205 of the HCSS via the first shared memory.

After the SFD and the SBD are loaded, in response to the SBD invoking an interface in the kernel space 204 that is designed to allocate memory, the first shared memory is created by allocating a first memory region of the HCSS as the first shared memory. Then it needs to map the first shared memory to the user space 205 of the HCSS from the kernel space 204 of the HCSS, so that the first shared memory can be accessed in the user space 205 of the HCSS with the same address accessed in the kernel space 204 of the HCSS. According to one embodiment of present disclosure, in response to an interface in kernel space 204 that is designed to manage memory being invoked, the first memory region can only be accessed by the SFD and the SBD. So the SFD and the SBD can communicate with each other via the first shared memory.

Before the Device 203 is started, a system disk is needed for the Device 203. A first virtual disk can be created as the system disk by invoking an interface that is designed for creating a virtual disk. At the same time, to prevent other applications of the HCSS from using it, the first virtual disk can be marked as the Device 203's system disk by the HCSS, though it has not been attached to any Device 203 yet. According to one embodiment of present disclosure, in response to an interface that is provided by the SBD and designed for creating a block device file for a virtual disk, the SBD, via the first shared memory, may send a message to the SFD and request the SFD to create a block device file. According to another embodiment of present disclosure, the HCSS may send a message to the SFD and request the SFD to create a block device file for the first virtual disk by invoking an interface that is designed for notifying a message. In response to receiving the message, the SFD in the kernel space 204 of the HCSS may create a first block device file in the user space 205 of the HCSS for the first virtual disk. The first block device file may contain the attributes that the first virtual disk has.

Once a user or the HCSS specifies which Device 203 will be started and the first block file as the system disk of the Device 203 by invoking an interface that is designed for starting the Device 203, the first block device file may be used to start the Device 203. The first block device file has to exist in the HCSS's user space 205 so the Device 203 can see it and use it as a system disk for the Device 203. It can be understood for the person skilled in the art, although the embodiment of present disclosure relies on "block device file" for attaching a system disk to the Device 203, there may exist such operating system (OS), i.e., the implementation of such OS does not have any concept of "block device file", therefore there is no need to rely on any "block device file" for attaching a system disk to the Device 203. So "block device file" in present disclosure is merely for the purpose of illustration without suggesting any limitation as to the scope of the present disclosure.

At step S300, receiving an I/O request of a first type from a Device constructed with virtualization technology by a SFD. Once the Device 203 is started and the Device 203 wants to write/read the system disk, the I/O requests of a first type, read requests or write requests to the system disk, will be generated in the Device 203 and needs to be transferred to the storage I/O module for processing. The I/O requests of the first type may be forwarded to the first block device file from the Device 203. Then the I/O requests of the first type may be acquired by the SFD from the first block device by invoking an interface provided by the SFD.

At step S302, transferring the I/O request of the first type and its corresponding I/O response of a first type between the Device and the Storage I/O processing module via a first shared memory by the SFD.

The I/O requests can be transferred from SFD to the SBD via the first shared memory. According to one embodiment of present disclosure, in response to the SFD invoking an interface that is designed for accessing memory, the I/O requests of the first type are written into the first shared memory. According to one embodiment of present disclosure, the SBD can read the I/O requests of the first type from the first shared memory by polling the shared memory. According to another embodiment of present disclosure, the SBD can acquire the I/O requests of the first type from the first shared memory upon receiving the interruption notification from the SFD. At last, the I/O requests of the first type can be forwarded to the Storage I/O processing module 202 for processing. The Storage I/O processing module 202 may further access the persistent storage resource according to the address in the request and acquire the corresponding responses of the first type including read success with the data read out, read failure, write success or write failure.

The I/O responses of the first type can be forwarded from the Storage I/O processing module 202 to the SBD. In response to the SBD invoking an interface that is designed for accessing memory, the responses of the first type can be written into the first shared memory. The SFD can read the I/O responses from the first shared memory by polling or interruption mechanism. So the I/O responses can be transferred from the SBD to the SFD via the first shared memory. Then, the SFD may forward the I/O responses of the first type to the first block device file. At last, the first block device file is transferred to the VM from the first block device file. The whole I/O transmission process for the system disk of the Device 203 in the HCSS completes.

Figure 4:
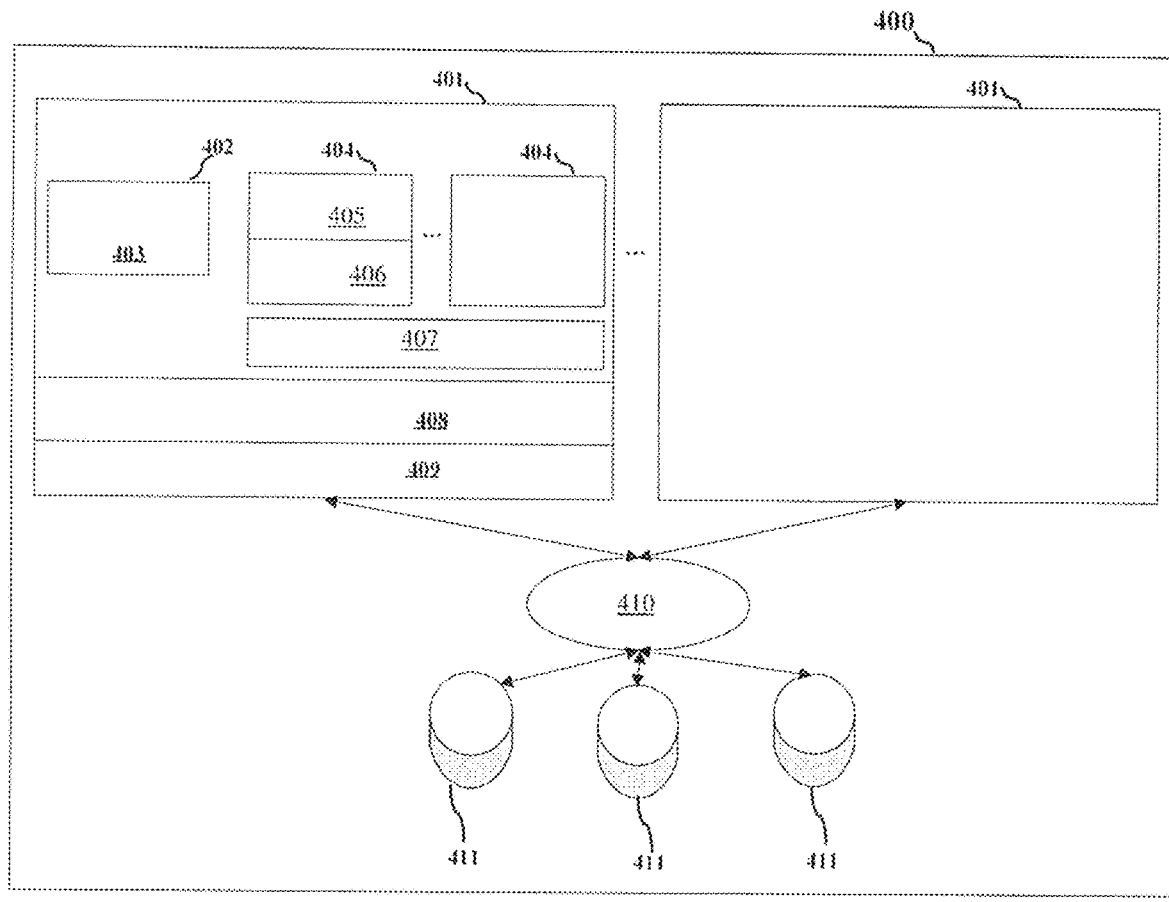
FIG. 4 illustrates Hyper-converged Storage System (HCSS) 400 implemented with VM according to one embodiment of present disclosure.

FIG. 4 shows Hyper-converged Storage System (HCSS) 400 implemented with VM according to one embodiment. HCSS 400 includes at least one Storage node 401, Switch 410 and at least one Disk array 411. The Storage nodes 401 are connected by the Switch 410. The Disk arrays 411 provided by other storage devices are connected by the Switch 410. The Storage nodes 401 have Physical disk 409. The Physical disk 409 and the Disk arrays 411 may be virtualized as virtual disk(s) by the Storage I/O processing module 403. The Storage node 401 is divided into kernel space 408 and user space 402, wherein user space 402 includes the Storage I/O processing module 403 and at least VM(s) 404. VM(s) 404 is hosted by HCSS 400's built-in Hypervisor 407. The VM(s) 404 is divided into VM user space 405 and VM kernel space 406. Virtual disk(s) are provided to the VM(s) 404 as a system disk or data disk (s). I/O requests to the system disk or data disk are generated in the VM(s) 404. The Storage I/O processing module 403 may acquire the I/O requests from the VM(s) 404 and further access persistent storage resource using the I/O requests. At last, the Storage I/O processing module 403 may send the corresponding responses back to VM(s) 404.

Figure 5:
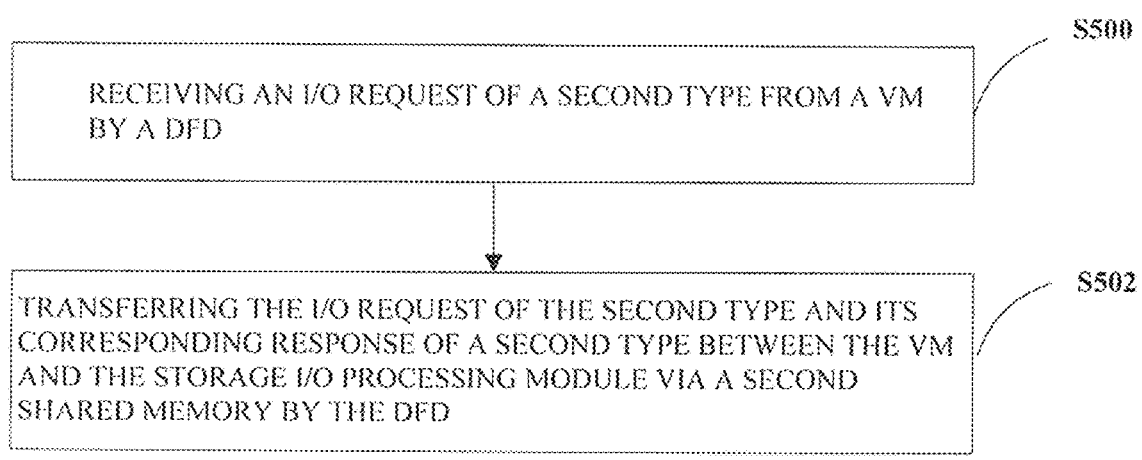
FIG. 5 is a flowchart illustrating an exemplary method for I/O data transmission in Hyper-converged Storage System (HCSS) 400 according to one embodiment of present disclosure.

FIG. 5 describes an exemplary method for I/O data transmission for data disk(s) of a VM in a Hyper-converged Storage System (HCSS) 400 according to another embodiment of present disclosure. With reference now to FIG. 5, starting at step S500, receiving an I/O request of a second type from a VM by a Data Disk Front-end Driver (DFD), wherein the I/O request of the second type is an I/O request to a data disk of the VM. At step S502, transferring the I/O request of the second type and its corresponding response of a second type between the VM and the Storage I/O processing module 403 via a second shared memory by the DFD, wherein the second shared memory is created by allocating a second memory region of the HCSS as the second shared memory.

In response to the initiation of the HCSS, a Data Disk Back-end Driver (DBD) is loaded, wherein the DBD is configured to allocate a second memory region of the HCSS as a second shared memory. According to one embodiment of present disclosure, the DBD can be implemented as a user space program in the storage I/O processing module 403 which can communicate with the driver code in VM kernel space 406. Then, in response to the DBD invoking an interface that is designed to allocate memory, the second memory region can be allocated as the second shared memory. Furthermore, the Data Disk Front-end Driver (DFD) is loaded at anytime after the VM 404 starts. According to one embodiment of present disclosure, the DFD can be implemented as a program that runs in VM kernel space 406 and can communicate with the driver code in the user space 402 of HCSS. Then it needs to map the second shared memory to the user space 402 of the HCSS from the kernel space 408 of the HCSS, so that the second shared memory can be accessed in the user space 402 of the HCSS with the same address accessed in the kernel space 408 of the HCSS. Then, an interface in kernel space 408 of the HCSS that is designed to manage memory is invoked, so the second memory region can only be accessed by the DBD and the DFD, and the DBD and the DFD can communicate with each other via the second shared memory.

According to user demand, one or more virtual disks need to be created by invoking an interface that is designed for creating virtual disks for data disks. According to one embodiment of present disclosure, a second virtual disk is created as a data disk of the VM 404. At the same time, to prevent other applications of the HCSS from using it, the created second virtual disk can be marked as the VM 404's data disk by the HCSS, though it has not been attached to any VM 404 yet. In response to an interface provided by the DBD and designed for creating a block device file for a virtual disk being invoked, the DBD, via the second shared memory, may send a message to the DFD and request the DFD to create a block device file. In response to receiving the message, the DFD may create a second block device file in the user space 402 of the VM 404 for the virtual disk. The second block device file may contain the attributes that the second virtual disk has. It can be understood for the person skilled in the art, although the embodiment of present disclosure relies on "block device file" for attaching a data disk to the VM 404, there may exist such OS, i.e., the implementation of such OS does not have any concept of "block device file", therefore there is no need to rely on any "block device file" for attaching a data disk to the VM 404. So "block device file" in present disclosure is merely for the purpose of illustration without suggesting any limitation as to the scope of the present disclosure.

The VM 404 may use the second block device file as the data disk after the VM being started. The second block device file has to be exist in the VM 404's user space 402 so that the VM 404 can see it and use it as a data disk for the VM 404.

At step S500, receiving an I/O request of a second type from a VM by a DFD, wherein the I/O request of the second type is an I/O request to a data disk of the VM. When an Application in the VM 404 wants to write/read the data disk, I/O requests of a second type, read requests or write requests to the data disk, may be generated in the VM 404. The I/O requests of the second type need to be transferred to the Storage I/O processing module 403 for processing. The I/O requests of the second type may be forwarded to the second block device file from the VM 404. Then the I/O requests of the second type may be acquired by the DFD from the second block device file by invoking an interface provided by the DFD.

At step S502, transferring the I/O request of the second type and its corresponding response of a second type between the VM and the Storage I/O processing module 403 via a second shared memory by the DFD.

According to one embodiment of present disclosure, the I/O requests of the second type can be transferred from DFD to the DBD via the second shared memory. The following will describe this transfer process. In response to the DFD invoking an interface that is designed for accessing memory, the I/O requests of the second type can be written into the second shared memory. According to one embodiment of present disclosure, the DBD can read the I/O requests of the second type from the second shared memory by polling the second shared memory. According to another embodiment of present disclosure, the DBD can acquire the I/O requests of the second type from the second shared memory upon receiving the interruption notification from the DFD. At last, the I/O requests of the second type can be forwarded to the Storage I/O processing module 403 for processing from the DBD. The storage I/O processing module 403 may further access the persistent storage resource according to the address in the I/O requests of the second type and acquire the corresponding I/O responses of the second type including read success with the data read out, read failure, write success or write failure.

The I/O responses of the second type further need to be transferred to the VM 404 from the Storage I/O processing module 403 via the second shared memory. The following will describe this transfer process. The I/O responses can be forwarded from the Storage I/O processing module 403 to the DBD. In response to the DBD invoking an interface that is designed for accessing memory, the responses can be written into the second shared memory. The DFD can read the I/O responses of the second type from the second shared memory by polling or interruption mechanism. So the I/O responses of the second type can be transferred from the SBD to the SFD via the second shared memory. Then, the I/O responses can be forwarded to the second block device file from the DFD. At last, the second block device file can be transferred to the VM 404 from the second block device file. The whole I/O transmission process for the data disk of the VM 404 in the HCSS completes.

Since there is no need for the hypervisor to involve the I/O transmission process for the data disk, so it will take less time to transfer I/O data between the VM 404 and the Storage I/O processing module 403. Therefore, the HCSS can transfer more I/O data and get better I/O performance for data disk(s) I/O transmission.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
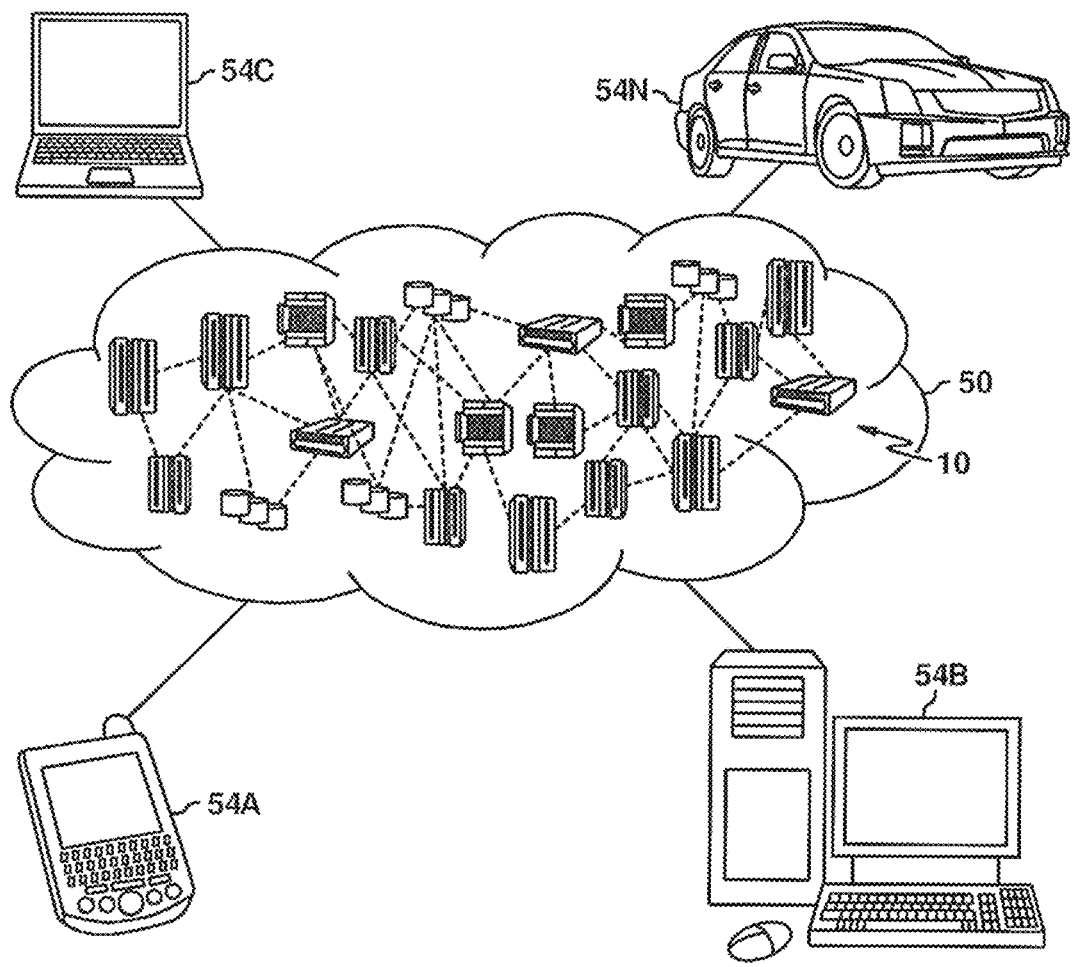
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
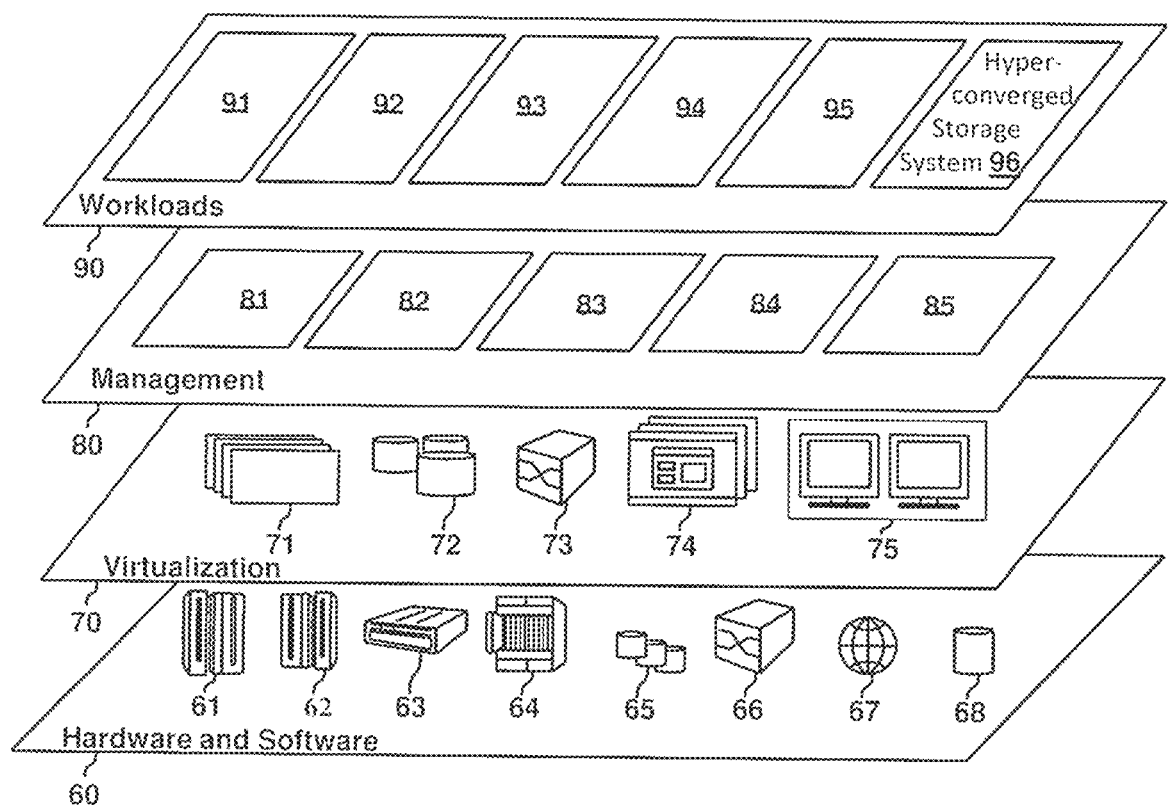
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Hyper-Converged Storage System 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for input/output (I/O) data transmission in a Hyper-Converged Storage System (HCSS), the method comprising:
   receiving, from at least one device on an HCSS having at least one storage node, wherein the device is constructed with virtualization technology and a storage I/O processing module for accessing a persistent storage resource of the HCSS, an I/O request of a first type, the I/O request of the first type being an I/O request to a system disk of the device by a System Disk Front-end Driver (SFD), the SFD implemented as a program within a kernel space of the at least one storage node of the HCSS, which can communicate with a driver code in a user space of the at least one storage node via a first shared memory, wherein the first shared memory is allocated from the kernel space of the at least one storage node of the HCSS and can only be accessed by the SFD and a System Disk Back-end Driver (SBD); and
   transferring, via the first shared memory, the I/O request of the first type and its corresponding response of a first type between the device and the storage I/O processing module by the SFD, the first shared memory being created by allocating a first memory region of the HCSS as the first shared memory.

2. The method of claim 1, wherein the SBD and the SFD are loaded in response to an initialization of the HCSS, the SBD being configured to allocate the first memory region of the HCSS as the first shared memory, wherein the SBD is implemented as a program in the storage I/O processing module in the user space of the at least one storage node, and wherein the first shared memory is mapped to the user space of the HCSS from the kernel space of the HCSS, and wherein an address to access the first shared memory from the kernel space of the HCSS is the same as an address to access the first shared memory from the user space of the HCSS.

3. The method of claim 2, wherein the receiving from the device an I/O request of a first type further comprising:
   creating a first block device file as the system disk of the device;
   receiving, via the first block device file, the I/O request of the first type from the device.

4. The method of claim 2, wherein the I/O request of the first type is transferred from SFD to the SBD via the first shared memory and further forwarded from the SBD to the storage IO processing module.

5. The method of claim 2, wherein the I/O response of the first type is forwarded from the storage IO processing module to the SBD and further transferred from the SBD to the SFD via the first shared memory.

6. The method of claim 1, wherein the device is a Virtual Machine (VM), the method further comprising:
   receiving, from the VM, an I/O request of a second type, the I/O request of the second type being an I/O request to a data disk of the VM by a Data Disk Front-end Driver (DFD);
   transferring, via a second shared memory, the I/O request of the second type and its corresponding response of a second type between the VM and the storage I/O processing module, the second shared memory being created by allocating a second memory region of the HCSS as the second shared memory by the DFD.

7. The method of claim 6, wherein a Data Disk Back-end Driver (DBD) and the DFD are loaded, the DBD being configured to allocate a second memory region of the HCSS as the second shared memory.

8. The method of claim 7, wherein the receiving from the VM an I/O request of a second type further comprising:
   creating a second block device file as the data disk of the VM;
   receiving, via the second block device file, the I/O request of the second type from the VM.

9. The method of claim 7, wherein the I/O request of the second type is transferred from DFD to the DBD via the second shared memory and further forwarded from the DBD to the storage I/O processing module.

10. The method of claim 7, wherein the I/O response of the second type is forwarded from the storage I/O processing module to the DBD and further transferred from the DBD to the DFD via the second shared memory.

11. A system for input/output (I/O) data transmission in a Hyper-Converged Storage System (HCSS), the HCSS comprising:
one or more processors, one or more computer-readable memories, one or more computer-readable tangible storage devices, and program instructions stored on at least one of the one or more storage devices for execution by at least one of the one or more processors via at least one of the one or more memories, the program comprising:
program instructions to receive, from at least one device on an HCSS having at least one storage node, wherein the device is constructed with virtualization technology and a storage I/O processing module for accessing a persistent storage resource of the HCSS, an I/O request of a first type, the I/O request of the first type being an I/O request to a system disk of the device by a System Disk Front-end Driver (SFD), the SFD implemented as a program within a kernel space of the at least one storage node of the HCSS, which can communicate with a driver code in a user space of the at least one storage node via a first shared memory, wherein the first shared memory is allocated from the kernel space of the at least one storage node of the HCSS and can only be accessed by the SFD and a System Disk Back-end Driver (SBD); and
program instructions to transfer, via the first shared memory, the I/O request of the first type and its corresponding response of a first type between the device and the storage I/O processing module by the SFD, the first shared memory being created by allocating a first memory region of the HCSS as the first shared memory.

12. The system of claim 11, wherein the SBD and the SFD are loaded in response to an initialization of the HCSS, the SBD being configured to allocate the first memory region of the HCSS as the first shared memory, wherein the SBD is implemented as a program in the storage I/O processing module in the user space of the at least one storage node, and wherein the first shared memory is mapped to the user space of the HCSS from the kernel space of the HCSS, and wherein an address to access the first shared memory from the kernel space of the HCSS is the same as an address to access the first shared memory from the user space of the HCSS.

13. The system of claim 12, wherein the I/O request of the first type is transferred from SFD to the SBD via the first shared memory and further forwarded from the SBD to the storage IO processing module.

14. The system of claim 12, wherein the I/O response of the first type is forwarded from the storage IO processing module to the SBD and further transferred from the SBD to the SFD via the first shared memory.

15. The system of claim 11, wherein the device is a Virtual Machine (VM), the system further comprising:
program instructions to receive, from the VM, an I/O request of a second type, the I/O request of the second type being an I/O request to a data disk of the VM by a data disk front-end driver (DFD);
program instructions to transfer, via a second shared memory, the I/O request of the second type and its corresponding response of a second type between the VM and the storage I/O processing module by the DFD, the second shared memory being created by allocating a second memory region of the HCSS as the second shared memory.

16. The system of claim 15, wherein a data disk back-end driver (DBD) and the DFD are loaded, the DBD being configured to allocate a second memory region of the HCSS as a second shared memory.

17. A computer program product for input/output (I/O) data transmission in a Hyper-Converged Storage System (HCSS), the computer program product comprising:
a computer-readable storage device and program instructions stored on computer-readable storage device, the program instructions comprising:
program instructions to receive, from at least one device on an HCSS having at least one storage node, wherein the device is constructed with virtualization technology and a storage I/O processing module for accessing a persistent storage resource of the HCSS, an I/O request of a first type, wherein the I/O request of the first type is an I/O request to a system disk of the device by a System Disk Front-end Driver (SFD), the SFD implemented as a program within a kernel space of the at least one storage node of the HCSS, which can communicate with a driver code in a user space of the at least one storage node via a first shared memory, wherein the first shared memory is allocated from the kernel space of the at least one storage node of the HCSS and can only be accessed by the SFD and a System Disk Back-end Driver (SBD); and
program instructions to transfer, via the first shared memory, the I/O request of the first type and its corresponding response of a first type between the device and the storage I/O processing module by the SFD, the first shared memory being created by allocating a first memory region of the HCSS as the first shared memory.

18. The computer program product of claim 17, wherein the SBD and the SFD are loaded in response to an initialization of the HCSS, the SBD being configured to allocate the first memory region of the HCSS as the first shared memory, wherein the SBD is implemented as a program in the storage I/O processing module in the user space of the at least one storage node, and wherein the first shared memory is mapped to the user space of the HCSS from the kernel space of the HCSS, and wherein an address to access the first shared memory from the kernel space of the HCSS is the same as an address to access the first shared memory from the user space of the HCSS.

19. The computer program product of claim 17, wherein the device is a Virtual Machine (VM), the computer program product further comprising:
program instructions to receive, from the VM, an I/O request of a second type, the I/O request of the second type being an I/O request to a data disk of the VM by a Data Disk Front-end Driver (DFD);
program instructions to transfer, via a second shared memory, the I/O request of the second type and its corresponding response of a second type between the VM and the storage I/O processing module by the DFD, the second shared memory being created by allocating a second memory region of the HCSS as the second shared memory.

20. The computer program product method of claim 19, wherein a Data Disk Back-end Driver (DBD) and the DFD are loaded, the DBD being configured to allocate a second memory region of the HCSS as a second shared memory.

* * * * *